(12) United States Patent
Sneed, III

(10) Patent No.: US 8,706,454 B2
(45) Date of Patent: Apr. 22, 2014

(54) TRANSMISSION EVALUATION

(75) Inventor: Joseph E. Sneed, III, Vestavia, AL (US)

(73) Assignee: Southern Company Services, Inc., Atlanta, GA (US)

( * ) Notice: Subject to any disclaimer, the term of this patent is extended or adjusted under 35 U.S.C. 154(b) by 108 days.

(21) Appl. No.: 13/171,753

(22) Filed: Jun. 29, 2011

(65) Prior Publication Data

US 2013/0006600 A1    Jan. 3, 2013

(51) Int. Cl.
*G06G 7/48*    (2006.01)

(52) U.S. Cl.
USPC ..................................... 703/4; 703/2; 703/28

(58) Field of Classification Search
USPC .................................................. 703/4, 2, 28
See application file for complete search history.

(56) References Cited

U.S. PATENT DOCUMENTS 5,798,939 A * 8/1998 Ochoa et al. .................. 700/286
2012/0316836 A1* 12/2012 Castelli et al. ................ 702/183

OTHER PUBLICATIONS

Michael Vaughn et al., Idaho Power RAS: A Dynamic Remedial Action Case Study, 2010, Idaho Power Company and Schweitzer Engineering Laboratories, Inc., pp. 1-9.*

Lizhi Wang and Mainak Mazumdar, Contingency Selection in Security Constrained Optimal Power Flow Problem: A Multi-Objective Approach, Feb. 22, 2006, Department of Industrial Engineering University of Pittsburgh, pp. 1-24.*

William Corbett Smith, Production costing with transmission constrains,Mar. 1989, College of Engineering and Technology, Ohio University, pp. 1-256.*

* cited by examiner

*Primary Examiner* — Omar Fernandez Rivas
*Assistant Examiner* — Iftekhar Khan
(74) *Attorney, Agent, or Firm* — Thomas Horstemeyer LLP

(57) ABSTRACT

Disclosed are various embodiments for transmission evaluation. In one embodiment, among others, a method includes evaluating a plurality of contingencies to generate a plurality of contingency results, where at least one of the contingency results includes an overload condition. The evaluation is based at least in part upon a case associated with a transmission network. The method further includes sorting the plurality of contingency results based upon corresponding overload-contingency pairs and determining a potential remediation solution to the overload condition based at least in part upon the overload-contingency pair. In another embodiment, a system includes a transmission evaluation application executed in a computing device. The application includes logic that obtains a plurality of contingency evaluation results including an overload condition, determines at least one potential remediation solution to the overload condition, updates the case to include the potential remediation solution, and generates a second plurality of contingency evaluation results.

19 Claims, 4 Drawing Sheets

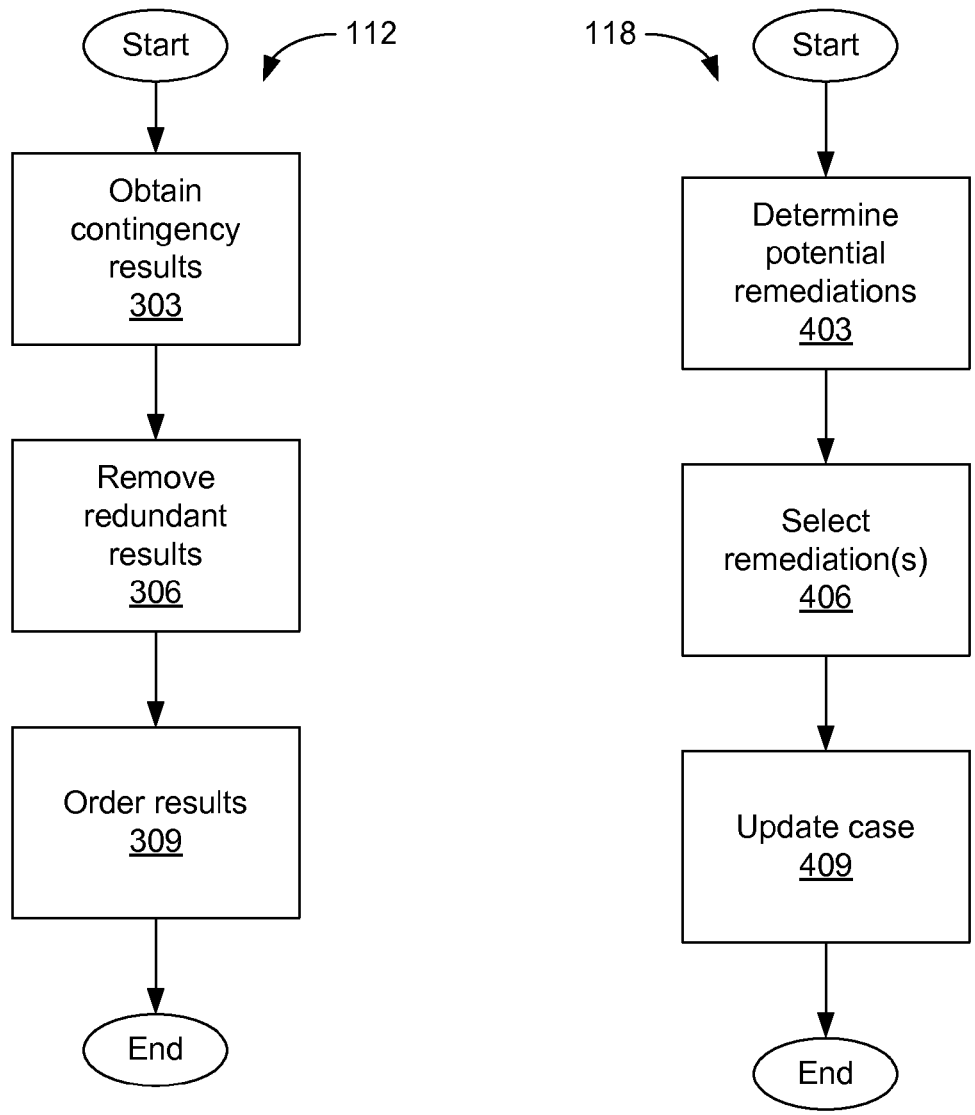

TRANSMISSION EVALUATION

BACKGROUND

Transmission of power through transmission systems is dependent upon the transmission network capabilities. Simulation of the transmission system under specific loading conditions and network configurations provides indications of power flow distribution and line loading within the system.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 1-4 are flowcharts illustrating examples of transmission evaluation in accordance with various embodiments of the present disclosure.

DETAILED DESCRIPTION

Figure 1:
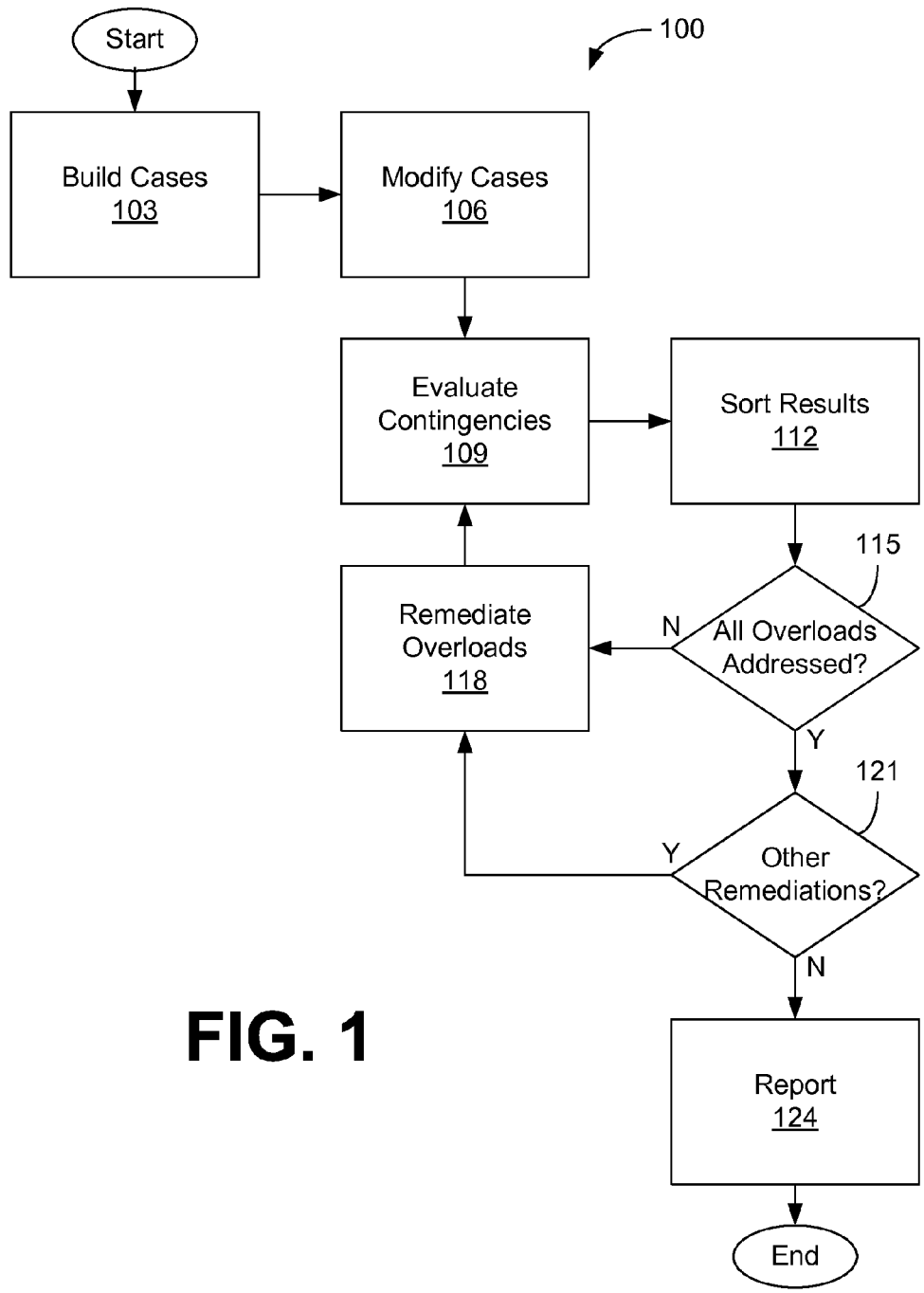

In the following discussion, various systems and methods are described to provide evaluation of transmission networks. Reference will now be made in detail to the description of the embodiments as illustrated in the drawings, wherein like reference numbers indicate like parts throughout the several views.

Various modifications to a transmission system to account for potential overload conditions of a transmission system can be evaluated to determine which options may correct or avoid the overload conditions. The cost of the modifications further impacts the viability of the available options. The ability to evaluate the transmission system allows for cost effective planning of the modifications to cope with future conditions.

When performing loading or thermal studies on a transmission system, large numbers of cases are typically analyzed. The analysis consists of checking the transmission network for overloaded lines after taking a "contingency" (i.e., a modification of the transmission system by opening up or removing a section of the network). For each case, hundreds of contingencies may be taken which may yield hundreds or thousands of results. Records of the results may include information such as, e.g., the facility that was overloaded, the contingency that caused the overload, the level of the overload, etc. The results may then be examined to determine how to resolve the overloads given the assumed network conditions. Solution categories that may be available to alleviate an overload condition include operating around the problem (i.e., reconfiguration of the network), dispatching around the problem (i.e., change or modify generation within the network), building new facilities, and/or upgrading existing facilities. Each solution has an associated cost (e.g., an estimated implementation cost).

Referring to FIG. 1, shown is a flowchart illustrating an example of a transmission evaluation 100 that may be implemented as an application. Beginning with block 103, one or more case(s) are built for the transmission network. The cases are computer models of the transmission network that are utilized during the evaluation of the transmission system. The cases may be base cases that provide a fundamental model of the transmission network.

The cases may then be modified in block 106 to include changes to the transmission network based upon project, study, and/or evaluation conditions. A modified case may be produced by adding or modifying the base case to include, e.g., a new generator unit that is anticipated to be added or potential upgrades to the capacity of a transmission line or transformer. In addition, the modified case may also take into account components of the transmission system that are out of service, disabled, or removed from the network. Simulations may be performed to determine the transmission flows and/or loading of the modified case conditions. In some cases, simulations may be performed to determine the transmission flows and/or loading under the base case conditions without modification. The modified (or base) cases, simulation results, and their association may be stored in a data store for later access and/or retrieval. The modified case may be identified by a project or study name and associated with a script. Additional information such as, e.g., cost, status, and comments may also be stored.

Figure 2:
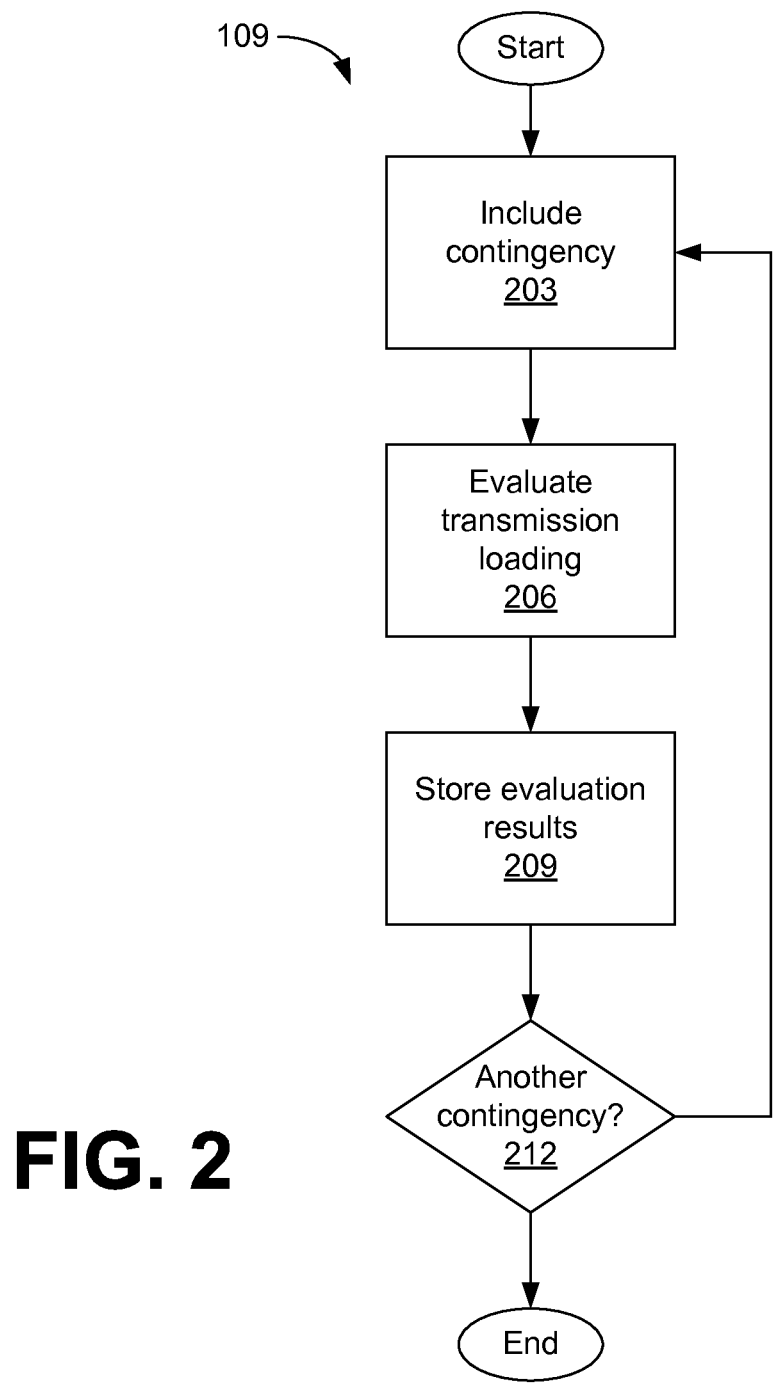

In block 109, the modified cases are evaluated for contingencies that may occur in the transmission network under the study or evaluation conditions. For example, a lightning strike may cause the network to lose a transmission line, which is considered a contingency. The modified cases are evaluated for a plurality of contingencies in block 109. As can be understood, base cases may also be evaluated for a plurality of contingencies in block 109. Referring to FIG. 2, shown is a flowchart illustrating an example of the contingency evaluation. A contingency is included in the case in block 203. For example, the contingency may be the removal of a first transmission line from the modified case. The flows and/or loading of the transmission network are determined through simulation in block 206 and the results (and their association to the contingency and case) are stored in block 209. In block 212, it is determined if another contingency needs to be evaluated. If so, then the process returns to block 203 where the previous contingency is removed and the next contingency is included in the case for evaluation in block 206. Each contingency is evaluated in a similar fashion, which may produce thousands of results. As can be understood, contingencies can include loss of one or more transmission lines, generation unit outages, loss of transformers or distribution busses, or combinations thereof.

Referring back to FIG. 1, contingency evaluation results are sorted in block 112. The evaluation results may be sorted to remove redundant results and to prioritize the contingency results based upon, e.g., the corresponding overload conditions or upon a common contingency. In some implementations, contingency evaluation results that were determined over a period of years are sorted in block 112. Referring to FIG. 3, shown is a flowchart illustrating an example of sorting the contingency evaluation results. The contingency evaluation results are obtained in block 303. In some implementations, contingency evaluation results from multiple evaluations may be obtained from the data store (e.g., evaluations performed by different operators or associated with several different years of cases). In block 306, the obtained results are then processed to remove redundant contingency evaluation results. The filtered results are ordered in block 309. Due to the quantity of results that can be generated, sorting and culling the contingency evaluation results can simplify the identification of solutions associated with previous contingency evaluation results. Accumulating and organizing the results based upon their overload-contingency association (or pair such as, e.g., an overload condition in a section of the transmission network caused by the removal of another section of the network) may also be useful for identifying potential solutions.

Referring back to FIG. 1, the contingency evaluation results are examined in block 115 to determine whether the network overloads were addressed or corrected (i.e., whether the network loading was reduced below an overload threshold). If an overload still exists, then the overload conditions are remediated in block 118. Potential solutions for the overloads are identified and the modified case is updated to provide a potential solution case. Referring to FIG. 4, shown is a flowchart illustrating an example of remediation of the overload conditions. One or more potential remediation(s) are determined in block 403. A potential remediation may be determined in multiple ways such as, e.g., evaluation of the sorted contingency evaluation results to determine if a solution was previously identified for an overload-contingency pair, utilizing rules of thumb (e.g., in an expert system) to identify possible solutions, selecting a random solution for evaluation, or using other pattern recognition process to identify a potential solution. For example, a neural network may be used to identify a potential solution based upon evaluation results associated with the same contingency.

To identify previous remediation solutions, an overload-contingency pair in the sorted contingency evaluation results that is based upon the current contingency evaluation may be compared to the same overload-contingency pairs in the sorted contingency evaluation results that were previously evaluated. If a remediation was identified during one or more previous evaluation(s), the same remediation may be applied to the current overload-contingency pair. The association between an overload-contingency pair and its determined remediation can be included as part of the stored contingency evaluation results, stored as a separate record in the data store, or included in another relational database. For example, if the sorted contingency evaluation results include multiple results for the same overload-contingency pair, each previous result may be examined to determine if an identified remediation solution exists. If so, then the previous remediation(s) may also be applied to the current overload-contingency pair.

It may be possible that a plurality of remediation solutions have been associated with the overload-contingency pair. The remediation solutions may then be prioritized for consideration and application to the current case evaluation. For example, if one solution is associated with more of the previous overload-contingency pairs than the other solutions, then this remediation may be considered first. In other implementations, solutions that have been scheduled for implementation may be given priority over other solutions. Identified remediation solutions may also be prioritized based upon the level of overload, the associated cost, or other factors or combination of factors as can be understood.

In some implementations, a potential remediation may be identified from a listing of the remediation solutions that have been scheduled for completion. While a scheduled remediation that was previously associated with the overload-contingency pair would be considered a potential solution, other scheduled remediation solutions without an association with the overload-contingency pair may also be considered to be potential solutions. For example, if a new transmission line was scheduled for installation to resolve a different overload-contingency pair, it may not have been associated with other overload-contingency pairs during the previous evaluation process(es). The installation may, however, still be considered a potential remediation for the current overload condition. Considering some or all of the scheduled solutions that have not been associated with the overload-contingency pair may reduce the cost for correcting the overload condition. These potential remediation(s) may then be evaluated to determine if any of the potential solutions could resolve the current overload condition.

Potential remediation solutions may also be identified using rules of thumb that may be stored in the data store and used during the remediation determination. Rules of thumb can include rules addressing, e.g., upgrading, adding, or removing lines, transformers, generation units, or other transmission system components. The rule of thumb recommendations may be based upon standardized sizes or capacities, associated costs, or overload limits of the components. In addition, future capacity needs and/or implementation scheduling considerations may also be taken into account by the rules of thumb. Examples of a rule of thumb include upgrading a transmission line of a first size to a second size or installation of a second transformer in parallel with an existing transformer. Usage of the rule of thumb may be based upon ranges and/or thresholds for, e.g., standardized sizing or capabilities, future or projected capacity needs, associated cost, space availability, and/or implementation scheduling. The rules of thumb may be utilized by an expert system to determine one or more potential remediation solution(s). The rules of thumb may also provide a basis for prioritizing the potential remediation solutions.

Potential remediation solutions may also be randomly determined and evaluated to determine if they provide a viable solution to the overload-contingency pair. Such a method allows for consideration of potential solutions that had not been previously identified or would not be defined based upon the rules of thumb. In one implementation, a remediation solution may be randomly selected from a plurality of possible solutions and randomly positioned within the transmission network. For example, one or more transmission line(s) may be randomly added (or removed) between points within the transmission network and evaluated to determine if the overload condition was resolved. This may be repeated for a number of random placements to determine, in a brute force way, if a potential solution exists for the overload-contingency pair. The same random methodology may be applied for other modifications (e.g., randomly upgrading capacity) or to other transmission system components (e.g., transformers or generation units).

Potential remediation solutions may be determined in using one or more method(s) in a concurrent or sequential fashion depending upon determination criteria. For example, a plurality of potential solutions may be determined based upon overload-contingency pairs and their associated remediation solutions. If a remediation is not identified for each overload-contingency pair, then additional potential solutions may be determined based upon predefined rules of thumb. The rule of thumb solutions may be determined for each overload-contingency pair or may be limited to specific overload-contingency pairs (e.g., the overload-contingency pairs without an identified remediation). Remediation selection and evaluation may then be based upon the identified potential solutions. If additional remediation solutions are desired, then the remediation determination may continue by randomly considering potential solutions to determine additional remediation solutions.

After determining the potential remediation solutions in block 403, one or more potential solution(s) may be selected for evaluation in block 406 and the case may be updated in block 409. For example, a potential solution case may be generated by updating the modified case with the selected solution(s). In some implementations, a user may select the potential remediation solutions for evaluation, e.g., through an interactive network page on a user device.

Referring back to FIG. 1, the contingencies are evaluated in block 109 based upon the updated case (e.g., a potential solution case). The evaluation results may then be sorted in block 112 and examined in block 115 to determine whether the network overloads have been addressed by the selected remediation solution(s). If overload conditions still exist or new overload conditions are created by a previously applied remediation, then additional or alternative remediation solutions are considered in block 118 and evaluated in block 109. The remediation and evaluation sequence (blocks 118, 109, 112, and 115) may then continue or be repeated until all overloads are corrected. Other previously identified potential remediation solutions may be selected and evaluated and/or additional potential solutions may be identified and evaluated. Different combinations of potential solutions may also be considered during the evaluation sequence to determine if all overloads have been addressed in block 115. If it is determined that all potential solutions have been evaluated without correcting the overloads, then an error indication or warning may be provided.

If all overloads have been addressed in block 115, then in block 121 it is determined whether other remedies should be evaluated. For example, it may be desirable to determine which group of proposed remediation solutions that address the overloads provides an optimized solution (e.g., by minimizing the cost, maximizing future transmission system capabilities, or based upon other criteria as can be understood). The optimized solution may be determined with respect to a predefined threshold. The solution evaluation may also take into account changes in cost that are caused by changes in the remediation scheduling. In some implementations, the cost may be the incremental change in the cost associated with the rescheduling or the total cost including the rescheduling cost. The solution evaluation may also include an estimated need date for implementing the remediation solution(s). This may be based upon projected loading of the transmission network. The remediation and evaluation (blocks 118, 109, 112, 115, and 121) may then continue until the evaluations are complete (e.g., after an optimal solution meets predefined criteria, after a predefined number of evaluations are completed, or after all potential remediation solutions and/or their combinations have been evaluated).

When the transmission evaluation has been completed, the results may be reported in block 124. The results may also be stored in a data store for later retrieval. For example, a network page may be generated including at least a portion of the results. The reported results may include project information such as, but not limited to, case name(s), request information, dispatch type, unit conditions and status, etc. The network page may be provided to a user device for rendering or may be stored for later retrieval and rendering.

The results may be provided in various reports such as, e.g., an impact report or an improvement report, which may be presented as a spreadsheet or other appropriate format. The impact report may include, e.g., contingency, scenario, and project information, as well as rating and overload information, an indication of the limiting element, and/or other contingency evaluation results. The reported information may be sorted into sections for not overloaded conditions, overloaded conditions with a unit "on" or "off" (i.e., in service or not in service), and overloaded conditions when in the base (or modified) case. In addition to the project information, the improvements report may include information about one or more potential remediation solution(s) such as, e.g., the item associated with the improvement, the limiting facility, potential system improvement(s), estimated need date(s) and estimated cost(s). In addition, the improvements may be categorized based upon user criteria and an indication provided in the improvements report.

Figure 5:
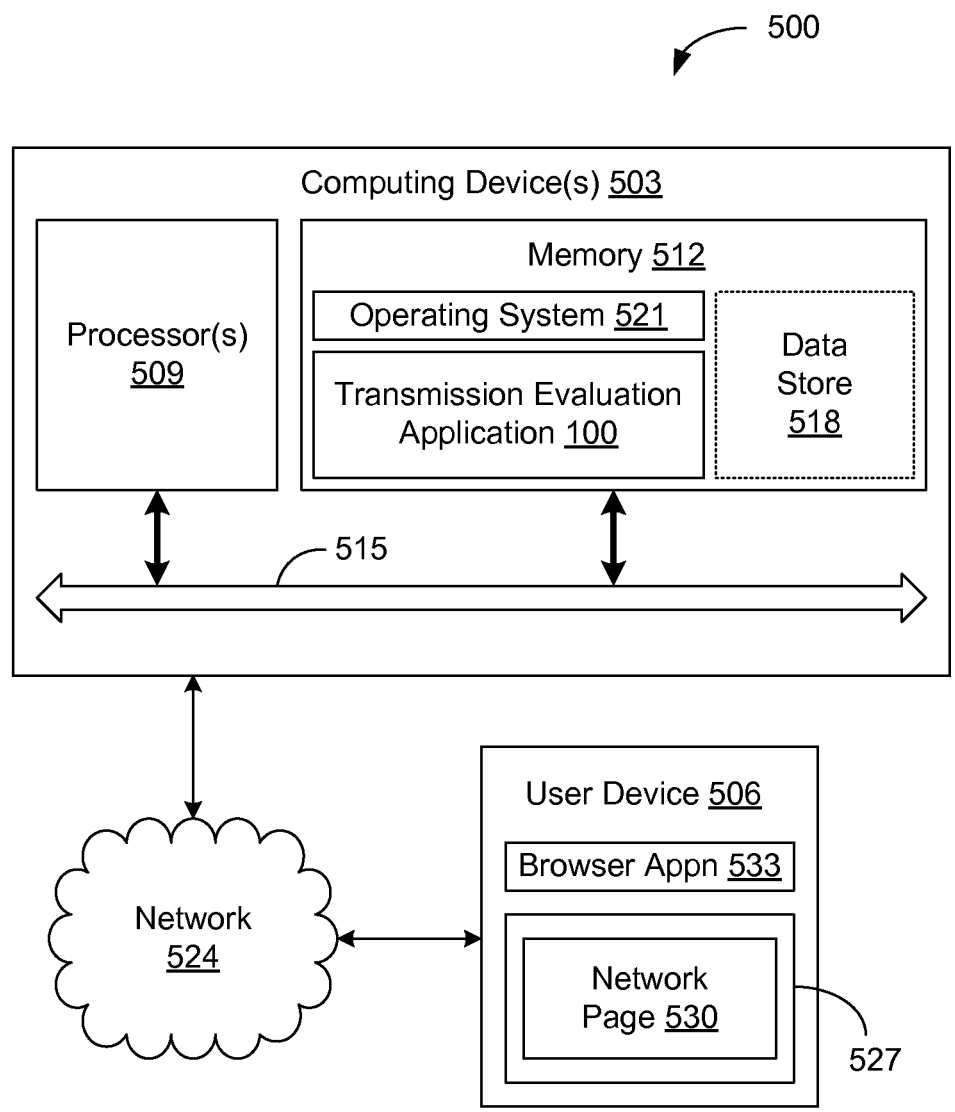
FIG. 5 is a graphical representation of an example of a system for executing the transmission evaluation application of FIGS. 1-4 in accordance with various embodiments of the present disclosure.

Referring now to FIG. 5, shown is an example of a system 500 for evaluating transmission within a transmission network. The system 500 includes one or more computing device(s) 503 and one or more user device(s) 506. The computing device 503 includes at least one processor circuit, for example, having a processor 509 and a memory 512, both of which are coupled to a local interface 515. To this end, the computing device(s) 503 may comprise, for example, a server computer or any other system providing computing capability. Alternatively, a plurality of computing devices 503 may be employed that are arranged, for example, in one or more server banks or computer banks or other arrangements. For example, a plurality of computing devices 503 together may comprise, for example, a cloud computing resource, a grid computing resource, and/or any other distributed computing arrangement. Such computing devices 503 may be located in a single installation or may be dispersed among many different geographical locations. For purposes of convenience, the computing device 503 is referred to herein in the singular. Even though the computing device 503 is referred to in the singular, it is understood that a plurality of computing devices 503 may be employed in the various arrangements as described above. The local interface 515 may comprise, for example, a data bus with an accompanying address/control bus or other bus structure as can be appreciated.

Stored in the memory 512 are both data and several components that are executable by the processor 509. In particular, stored in the memory 512 and executable by the processor 509 are a transmission evaluation application 100 (FIG. 1) and potentially other applications. Also stored in the memory 512 may be a data store 518 and other data. The data stored in the data store 518, for example, is associated with the operation of the various applications and/or functional entities described below. For example, the data store may include cases, contingencies, contingency evaluation results, potential remediation solutions, reports, and other data or information as can be understood. In addition, an operating system 521 may be stored in the memory 512 and executable by the processor 509. The data store 518 may be may be located in a single computing device or may be dispersed among many different devices.

The user device 506 is representative of a plurality of user devices that may be communicatively coupled to the computing device 503 through a network 524 such as, e.g., the Internet, intranets, extranets, wide area networks (WANs), local area networks (LANs), wired networks, wireless networks, networks configured for communication over a power grid, or other suitable networks, etc., or any combination of two or more such networks. In some embodiments, a user device 506 may be directly connected to the computing device 503.

The user device 506 may comprise, for example, a processor-based system such as a computer system. Such a computer system may be embodied in the form of a desktop computer, a laptop computer, a personal digital assistant, a cellular telephone, web pads, tablet computer systems, or other devices with like capability. The user device 506 includes a display device 527 upon which various network pages 530 and other content may be rendered. The user device 506 may be configured to execute various applications such as a browser application 533 and/or other applications. The browser application 533 may be executed in a user device 506, for example, to access and render network pages 530, such as web pages, or other network content served up by the computing device 503 and/or other servers. The user device 503 may be configured to execute applications beyond browser application 533 such as, for example, e-mail applications, instant message (IM) applications, and/or other applications.

The components executed on the computing device 503 include, for example, a transmission evaluation application 100 and other systems, applications, services, processes, engines, or functionality not discussed in detail herein. The transmission evaluation application 100 is executed in order to facilitate the evaluation of a transmission network. The transmission evaluation application 100 can generate network pages 530 such as web pages or other types of network content that are provided to a user device 506 in response to a request for the purpose of evaluating a transmission network. While the transmission evaluation 100 has been discussed with respect to power flow within a transmission network, it may be applied to other transmission networks such as, e.g., gas or oil pipeline networks.

It is understood that there may be other applications that are stored in the memory 512 and are executable by the processor 509 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 512 and are executable by the processor 509. In this respect, the term "executable" means a program file that is in a form that can ultimately be run by the processor 509. Examples of executable programs may be, for example, a compiled program that can be translated into machine code in a format that can be loaded into a random access portion of the memory 512 and run by the processor 509, source code that may be expressed in proper format such as object code that is capable of being loaded into a random access portion of the memory 512 and executed by the processor 509, or source code that may be interpreted by another executable program to generate instructions in a random access portion of the memory 512 to be executed by the processor 509, etc. An executable program may be stored in any portion or component of the memory 512 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 512 is defined herein as including both volatile and nonvolatile memory and data storage components. Volatile components are those that do not retain data values upon loss of power. Nonvolatile components are those that retain data upon a loss of power. Thus, the memory 512 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 509 may represent multiple processors 509 and the memory 512 may represent multiple memories 512 that operate in parallel processing circuits, respectively. In such a case, the local interface 515 may be an appropriate network that facilitates communication between any two of the multiple processors 509, between any processor 509 and any of the memories 512, or between any two of the memories 512, etc. The local interface 515 may comprise additional systems designed to coordinate this communication, including, for example, performing load balancing. The processor 509 may be of electrical or of some other available construction.

Although the transmission evaluation application 100, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 1-4 show the functionality and operation of an implementation of portions of a transmission evaluation application 100. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 509 in a computer system or other system. The machine code may be converted from the source code, etc. If embodied in hardware, each block may represent a circuit or a number of interconnected circuits to implement the specified logical function(s).

Although the flowcharts of FIGS. 1-4 show a specific order of execution, it is understood that the order of execution may differ from that which is depicted. For example, the order of execution of two or more blocks may be scrambled relative to the order shown. Also, two or more blocks shown in succession in FIGS. 1-4 may be executed concurrently or with partial concurrence. Further, in some embodiments, one or more of the blocks shown in FIGS. 1-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including transmission evaluation application 100, that comprises software or code can be embodied in any non-transitory computer-readable medium for use by or in connection with an instruction execution system such as, for example, a processor 509 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
    evaluating, in at least one computing device, a plurality of contingencies to generate a plurality of contingency results, where the evaluation is based at least in part upon a case associated with a transmission network, where at least one of the plurality of contingency results includes an overload condition in the transmission network;
    sorting, in the at least one computing device, the plurality of contingency results based upon corresponding overload-contingency pairs; and
    determining, in the at least one computing device, at least one potential remediation solution to the overload condition based at least in part upon the sorted plurality of overload-contingency pairs, where determining the at least one potential remediation solution comprises:
    determining at least one previous contingency result that corresponds to the contingency result including the overload condition based upon the corresponding overload-contingency pair; and
    designating a remediation solution associated with the at least one previous contingency result as the potential remediation solution to the overload condition.

2. The method of claim 1, further comprising the steps of:
    updating, in the at least one computing device, the case associated with the transmission network to include the at least one potential remediation solution;
    evaluating, in the at least one computing device, the plurality of contingencies to generate a second plurality of contingency results, the evaluation based at least in part upon the updated case; and
    determining, in the at least one computing device, whether the overload condition was corrected by the at least one potential remediation solution based upon the second plurality of contingency results.

3. The method of claim 2, further comprising the step of generating, in the at least one computing device, a network page for rendering by a user device, the network page including the at least one potential remediation solution.

4. The method of claim 2, further comprising the steps of:
    updating, in the at least one computing device, the case to include a second potential remediation solution in response to the overload condition determination; and
    evaluating, in the at least one computing device, the plurality of contingencies to generate a third plurality of contingency results, where the evaluation is based at least in part upon the updated case including the second potential remediation solution.

5. The method of claim 2, wherein the updating, evaluating, and determining steps are repeated to determine a plurality of potential remediation solutions that correct the overload condition.

6. The method of claim 5, further comprising the step of prioritizing, in the at least one computing device, the plurality of potential remediation solutions that correct the overload condition based at least in part upon a cost associated with each of the plurality of potential remediation solutions.

7. The method of claim 1, wherein sorting the plurality of contingency results comprises the steps of:
    obtaining a plurality of previous contingency results based upon an evaluation of a previous case associated with the transmission network, each previous contingency result having a corresponding overload-contingency pair; and
    sorting the plurality of contingency results and the plurality of previous contingency results based upon the corresponding overload-contingency pairs.

8. The method of claim 1, wherein the at least one potential remediation solution is determined, in the at least one computing device, based upon a rule of thumb associated with the overload-contingency pair.

9. The method of claim 8, wherein the rule of thumb determination of the potential remediation solution is based at least in part upon an overload limit.

10. The method of claim 8, wherein the rule of thumb determination of the potential remediation solution is based at least in part upon a projected capacity.

11. The method of claim 1, wherein the at least one potential remediation solution is randomly determined.

12. The method of claim 11, wherein the random determination comprises randomly positioning a transmission line within the transmission network.

13. The method of claim 1, further comprising the step of obtaining the case associated with the transmission network.

14. The method of claim 13, further comprising the step of modifying the case before evaluating the plurality of contingencies.

15. A system, comprising:
    at least one computing device; and
    a transmission evaluation application executed in the at least one computing device, the transmission evaluation application comprising:
    logic that obtains a plurality of contingency evaluation results, at least one of the plurality of contingency evaluation results including an overload condition based at least in part upon a case associated with a transmission network;
    logic that determines at least one potential remediation solution to the overload condition, where determining the at least one potential remediation solution comprises:
    determining at least one previous contingency result that corresponds to the at least one contingency result including the overload condition based upon a corresponding overload-contingency pair; and designating a remediation solution associated with the at least one previous contingency result as the at least one potential remediation solution to the overload condition;

logic that updates the case to include the at least one potential remediation solution; and logic that generates a second plurality of contingency evaluation results based at least in part upon the updated case.

16. The system of claim 15, wherein the plurality of contingency evaluation results includes a plurality of contingency evaluation results based at least in part upon the case and a plurality of previous contingency evaluation results based at least in part upon a different case associated with the transmission network.

17. The system of claim 16, wherein the at least one potential remediation solution is a remediation solution associated with at least one of the plurality of previous contingency evaluation results.

18. The system of claim 16, wherein the transmission evaluation application further comprises logic that determines whether the overload condition was corrected by the at least one potential remediation solution based upon the second plurality of contingency evaluation results.

19. The system of claim 18, wherein the transmission evaluation application further comprises logic that determines a cost associated with the at least one potential remediation solution.

* * * * *